United States Patent
Hoshino et al.

(10) Patent No.: US 7,880,673 B2
(45) Date of Patent: Feb. 1, 2011

(54) POSITION DETERMINATION SYSTEM AND POSITION DETERMINATION METHOD

(75) Inventors: Jin Hoshino, Tokyo (JP); Susumu Ogata, Yokohama (JP); Masatoshi Kimoto, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 408 days.

(21) Appl. No.: 11/771,497

(22) Filed: Jun. 29, 2007

(65) Prior Publication Data

US 2008/0122689 A1 May 29, 2008

(30) Foreign Application Priority Data

Jun. 30, 2006 (JP) ............... P2006-182505

(51) Int. Cl.
*G01S 19/12* (2010.01)
(52) U.S. Cl. .................... 342/357.49
(58) Field of Classification Search ...............
342/357.01–357.17, 357.2–357.78
See application file for complete search history.

(56) References Cited

U.S. PATENT DOCUMENTS

| | | | |
|---|---|---|---|
| 5,999,124 A | 12/1999 | Sheynblat | |
| 6,993,345 B2 * | 1/2006 | Ogino et al. | 455/456.1 |
| 7,196,660 B2 * | 3/2007 | Abraham et al. | 342/357.25 |
| 7,327,310 B2 * | 2/2008 | Abraham et al. | 342/357.02 |
| 7,498,984 B2 * | 3/2009 | Taniguchi | 342/357.4 |
| 2002/0085627 A1 | 7/2002 | Younis | |
| 2003/0107513 A1 | 6/2003 | Abraham et al. | |
| 2003/0125045 A1 | 7/2003 | Riley et al. | |
| 2004/0239558 A1 | 12/2004 | Geier et al. | |
| 2005/0020309 A1 | 1/2005 | Moeglein et al. | |

FOREIGN PATENT DOCUMENTS

| | | |
|---|---|---|
| JP | 2002-58058 | 2/2002 |
| JP | 2005-6319 | 1/2005 |
| JP | 2006-504284 | 2/2006 |
| WO | WO 03/058985 A2 | 7/2003 |

* cited by examiner

*Primary Examiner*—Thomas H Tarcza
*Assistant Examiner*—Nga X Nguyen
(74) *Attorney, Agent, or Firm*—Oblon, Spivak, McClelland, Maier & Neustadt, L.L.P.

(57) ABSTRACT

A position determination system includes a mobile terminal configured to receive GPS information from a GPS; a base station device configured to measure a round trip time (RTT) from the mobile terminal; a base-station position table unit configured to store position information on the base station device; a cable-length table unit configured to store a cable length between the base station device and an antenna assembly provided to the base station device, the antenna assembly communicates with the mobile terminal; and a position determination device configured to determine the position of the mobile terminal on the basis of the round trip time measured by the base station device, the cable length obtained from the cable-length table unit, the position information on the base station obtained from the base-station position table unit, and the GPS information received from the mobile terminal.

9 Claims, 10 Drawing Sheets

POSITION DETERMINATION SYSTEM AND POSITION DETERMINATION METHOD

CROSS REFERENCE TO RELATED APPLICATIONS

This is application is based upon and claims the benefit of priority from prior Japanese Patent Application No. 2006-182505, filed on Jun. 30, 2006; the entire contents of which are incorporated herein by reference.

BACKGROUND OF THE INVENTION

1. Field of the Invention

The present invention relates to a position determination system and a position determination method.

2. Description of the Related Art

Heretofore, in a mobile communication system, determining the position of a mobile terminal has been in practice. In order to determine the position of a mobile terminal, it is necessary to accurately determine the position of a base station which communicates with the mobile terminal, in particular, the position of an antenna assembly provided to the base station. It is also necessary to consider the length of a cable between the base station and the antenna assembly.

For this reason, there is disclosed a technique in which an antenna assembly receives GPS information from a GPS, and then the position of the antenna assembly is determined on the basis of the satellite signal and the length of the cable (refer to Japanese Patent Publication No. 2005-6319, for example).

However, since the aforementioned conventional technique uses GPS information to determine the position of an antenna assembly, the technique cannot be applied to a case where the base station is located where the base station cannot receive GPS information. Moreover, in a case where there are a large number of base stations, it is difficult to manage data of each of the base stations. For this reason, the application of the conventional technique is not practical.

SUMMARY OF THE INVENTION

A first aspect of the present invention provides a position determination system including: (a) a mobile terminal configured to receive GPS information from a GPS; (b) a base station device configured to measure a round trip time from the mobile terminal; (c) a base-station position table unit configured to store position information on the base station; (d) a cable-length table unit configured to store a cable length between the base station and an antenna assembly provided to the base station device, the antenna assembly communicates with the mobile terminal; and (e) a position determination device configured to determine the position of the mobile terminal on the basis of the round trip time measured by the base station device, the cable length obtained from the cable-length table unit, the position information on the base station obtained from the base-station position table unit, and the GPS information received from the mobile terminal.

According to the position determination system of the first aspect, regardless of the installation places or the number of base station devices, the position of a mobile terminal communicating with the base station device can be determined with high accuracy.

The position determination system of the first aspect may further include a table calculation device configured to update the base-station position table unit and the cable-length table unit on the basis of the GPS information received from the mobile terminal and of the round trip time received from the base station device.

The position determination system of the first aspect may further include a satellite number determination unit configured to transmit the GPS information to the table calculation device in a case where the number of satellites from which the mobile terminal has received the GPS information is equal to or greater than a predetermined number, and to transmit the GPS information to the position determination device in a case where the number of satellites from which the mobile terminal has received the GPS information falls below the predetermined number.

In the position system of the first aspect, the mobile terminal may include an initial setting input unit configured to receive an input of position information on the mobile terminal.

The position determination system of the first aspect may further include an antenna-position table unit configured to store position information on the antenna assembly. Here, the position determination device may further determine the position of the mobile terminal on the basis of the position information on the antenna assembly stored in the antenna-position table unit.

In the position determination system of the first aspect, the table calculation device updates the position information on the antenna assembly stored in the antenna-position table unit.

In the position determination system of the first aspect, the mobile terminal is LMU compliant.

A second aspect of the invention provides a position determination method comprising the steps of: (a) receiving GPS information from a GPS by a mobile terminal; (b) measuring a round trip time from the mobile terminal by a base station device; and (c) determining the position of the mobile terminal on the basis of the round trip time measured by the base station device, a cable length obtained from a cable-length table unit configured to store a cable length between a base station device and an antenna assembly communicating with the mobile terminal, position information on the base station device obtained from a base-station position table unit configured to store the position information on the base station device, and GPS information received from the mobile terminal.

According to the position determination method of the second aspect, regardless of the installation places or the number of base station devices, the position of a mobile terminal communicating with the base station device can be determined with high accuracy.

DETAILED DESCRIPTION OF THE INVENTION

Figure 1:
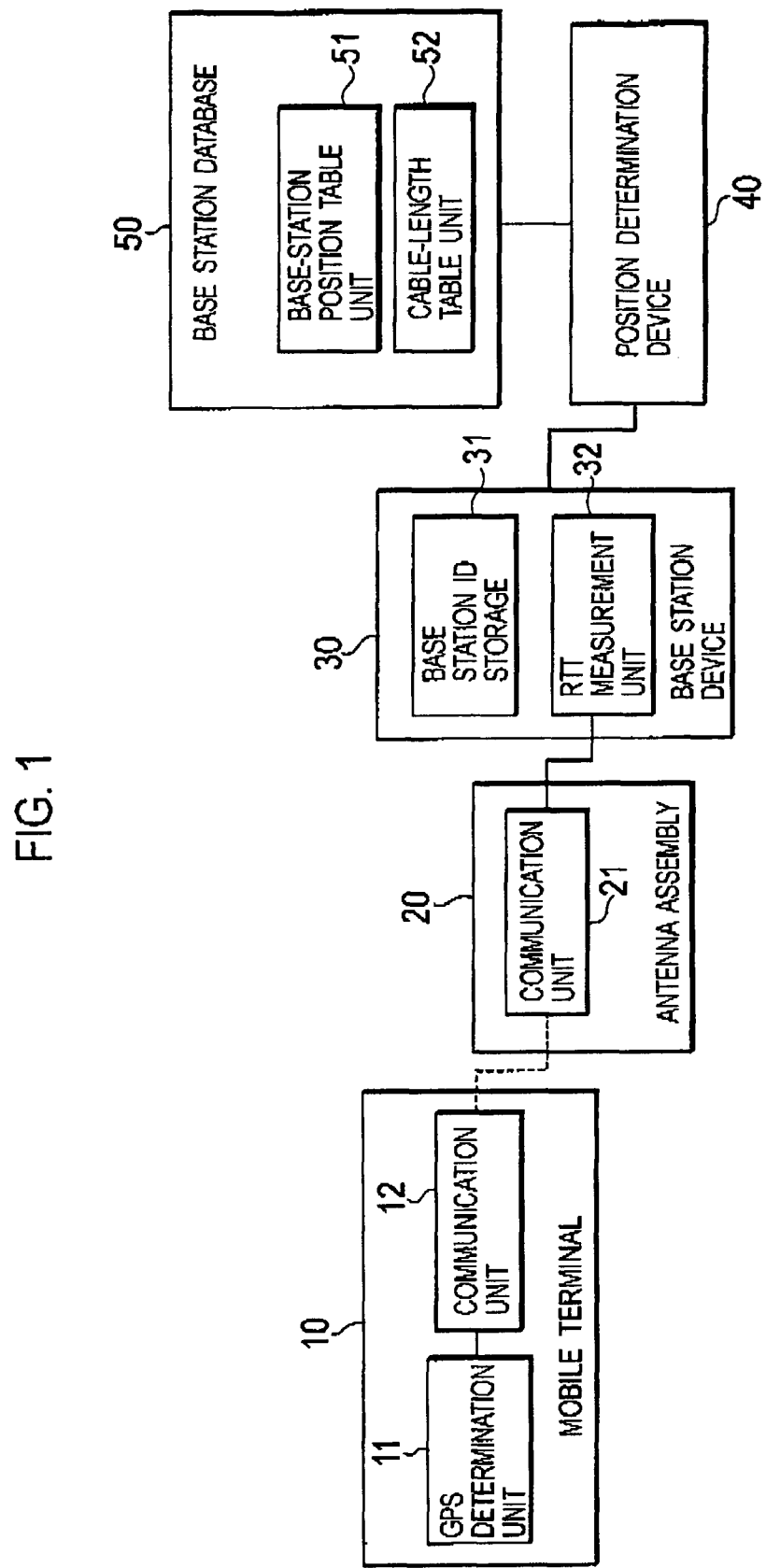
FIG. 1 is a configuration block diagram of a position determination system according to a first embodiment.

Next, descriptions will be given of embodiments of the present invention with reference to drawings. It should be noted that identical elements are denoted by identical reference numerals in the descriptions of the drawings below. However, it is to be noted that the drawings are only schematic representations.

First Embodiment

Position Determination System

As shown in FIG. 1, a position determination system according to a first embodiment is provided with a mobile terminal 10, an antenna assembly 20, a base station device 30, a position determination device 40 and a base station database 50.

The mobile terminal 10 is provided with a GPS determination unit 11 and a communication unit 12.

The GPS determination unit 11 voluntarily, or in the case of receiving a position determination request signal from another device, receives a satellite signal from a GPS.

The communication unit 12 transmits the obtained GPS information to a communication unit 21 of the antenna assembly 20. Then, the GPS information is transmitted to the position determination device 40 via the base station device 30.

The antenna assembly 20 is provided with the communication unit 21.

The communication unit 21 receives the GPS information from the communication unit 12 of the mobile terminal 10, and then transmits the GPS information to the base station unit 30.

The base station device 30 is provided with a base station ID storage 31 and an RTT measurement unit 32.

The base station ID storage 31 is configured to store a base station ID, which is an identification number unique to the base station device 30.

In order to find the distance between the mobile terminal 10 and the base station device 30, the RTT measurement unit 32 transmits an RTT signal to the mobile terminal 10 targeted for measurement. Then, the RTT measurement unit 32 receives an RTT signal from the mobile terminal 10. In the method of measuring a round trip time (hereinafter, referred to as an "RTT"), a time period is measured in which an RTT signal is transmitted from the base station device 30 to the mobile terminal 10, and then the RTT signal is returned to the base station device 30. Thereafter, an RTT value is calculated by dividing the measured period of time by 2. When an RTT value is found, the distance between the mobile terminal 10 and the base station device 30 can be found by multiplying light velocity by the RTT value.

It should be noted that information on an RTT signal is provided in "3GPP TS 25.215," or the like, and such RTT is preferably used.

However, the value found by the base station device 30 is the distance between the base station device 30 and the mobile terminal 10, and does not represent an accurate distance between the antenna assembly 20 and the mobile terminal 10.

The position determination device 40 refers to a base-station position table unit 51 and a cable-length table unit 52 of the base station database 50 and finds the distance between the mobile terminal 10 and the antenna assembly 20. To be specific, the distance is found by subtracting a cable length obtained from the cable-length table unit 52 from the distance between the mobile terminal 10 and the base station device 30. A method of computing the distance between the mobile terminal 10 and the antenna assembly 20 will be described later in detail.

The base station database 50 is provided with the base-station position table unit 51 and the cable-length table unit 52.

The base-station position table unit 51 is configured to store position information on the base station device 30.

The cable-length table unit 52 is configured to store the value of the cable length between the antenna assembly 20 and the base station device 30.

It is to be noted that the functions of the position determination device 40 and of the base station database 50 can be implemented by use of a personal computer provided with a CPU. For example, a module in the CPU may implement the functions of the position determination device 40. Furthermore, the functions of the base station database 50 may be implemented by an internal storage device such as a RAM, or an external storage device such as an HD.

(Position Determination Method)

Figure 2:
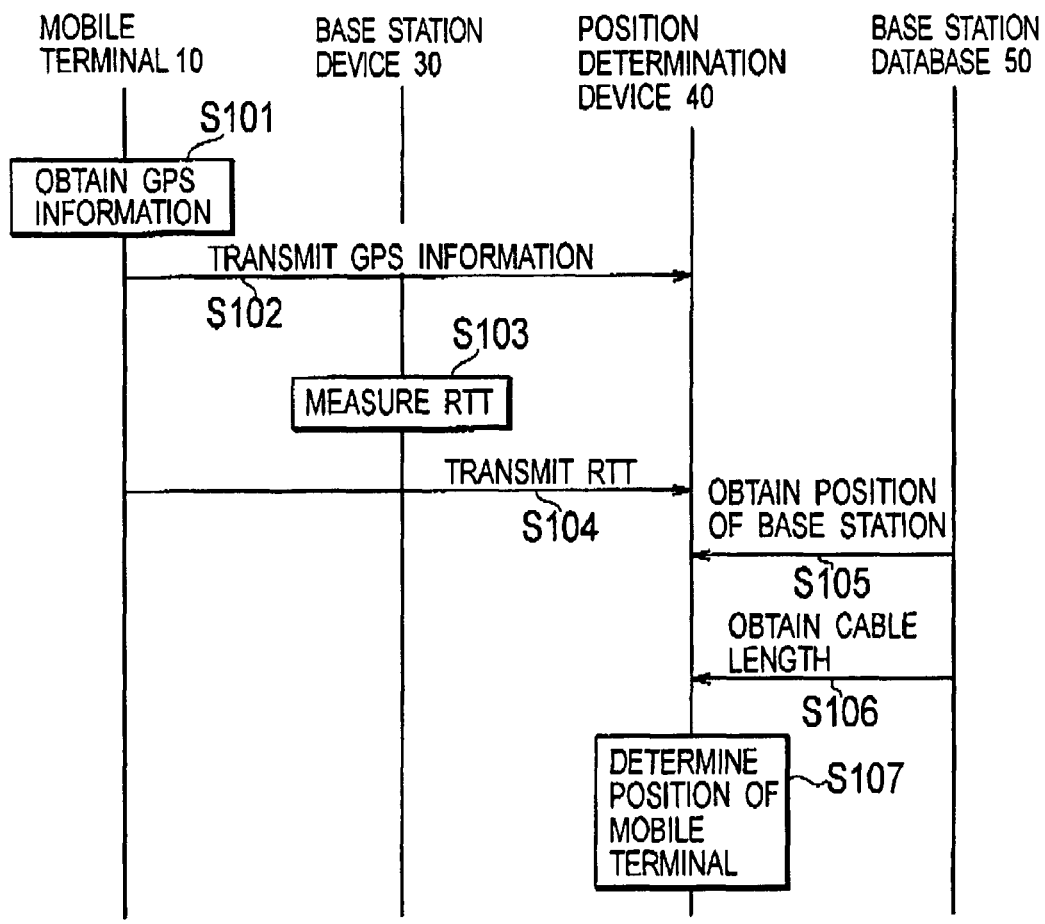
FIG. 2 is a sequence diagram showing a position determination method according to the first embodiment.

Next, a description will be given of a position determination method according to the first embodiment with reference to FIG. 2.

First, a mobile terminal obtains GPS information (S101) and then transmits the GPS information to the position determination device 40 via the antenna assembly 20 and the base station device 30 (S102).

On the other hand, the base station device 30 measures RTT by transmitting an RTT signal to the mobile terminal 10 (S103), and then transmits the RTT to the position determination device 40 (S104).

Next, the position determination device 40 obtains position information on the base station from the base station position database 50 (S105). Then, the position determination device 40 obtains the cable length between the antenna assembly 20 and the base station device 30 (S106).

Figure 3:
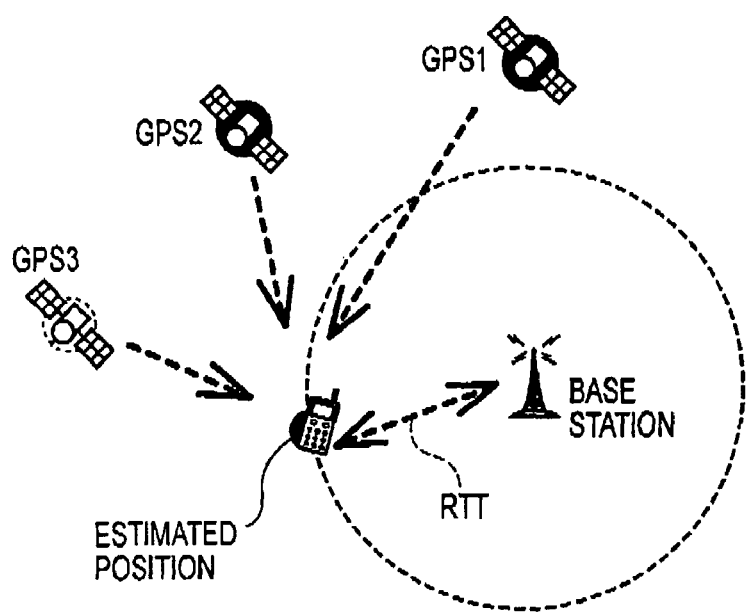
FIG. 3 is a diagram provided for describing the position determination method according to the first embodiment.

Next, the position determination device 40 finds the distance (RTT) between the mobile terminal 10 and the antenna assembly 20. This distance is found by subtracting the cable length obtained from the cable-length table unit 52 from the distance between the mobile terminal 10 and the base station device 30 previously calculated from the RTT. Then, as shown in FIG. 3, the position determination device 40 draws a sphere placing, as the center of the sphere, the position coordinate included in the obtained position information on the based station, while using the RTT' as the radius of the sphere. Next, the position determination device 40 overlaps GPS information on the sphere and determines the overlapped position as the position of the mobile terminal 10 (S107).

(Effect and Advantage)

According to the position determination system and the position determination method in the case of the first embodiment, the position of a mobile terminal 10 can be determined by using the RTT measured by the base station device 30, the cable length obtained from the cable-length table unit 52, the position information on the base station device obtained from the base-station position table unit 51 and the GPS information received from the mobile terminal 10. Thus, the position of the mobile terminal 10, which communicates with the base station device 30, can be determined with high accuracy regardless of the installation places or the number of base stations 30.

Second Embodiment

In the position determination system described in the first embodiment, there is a possibility that an error is included in the cable length and the position information on the base station device. In a second embodiment, the base-station position table unit 51 and the cable-length table unit 52 are updated as appropriate.

Figure 4:
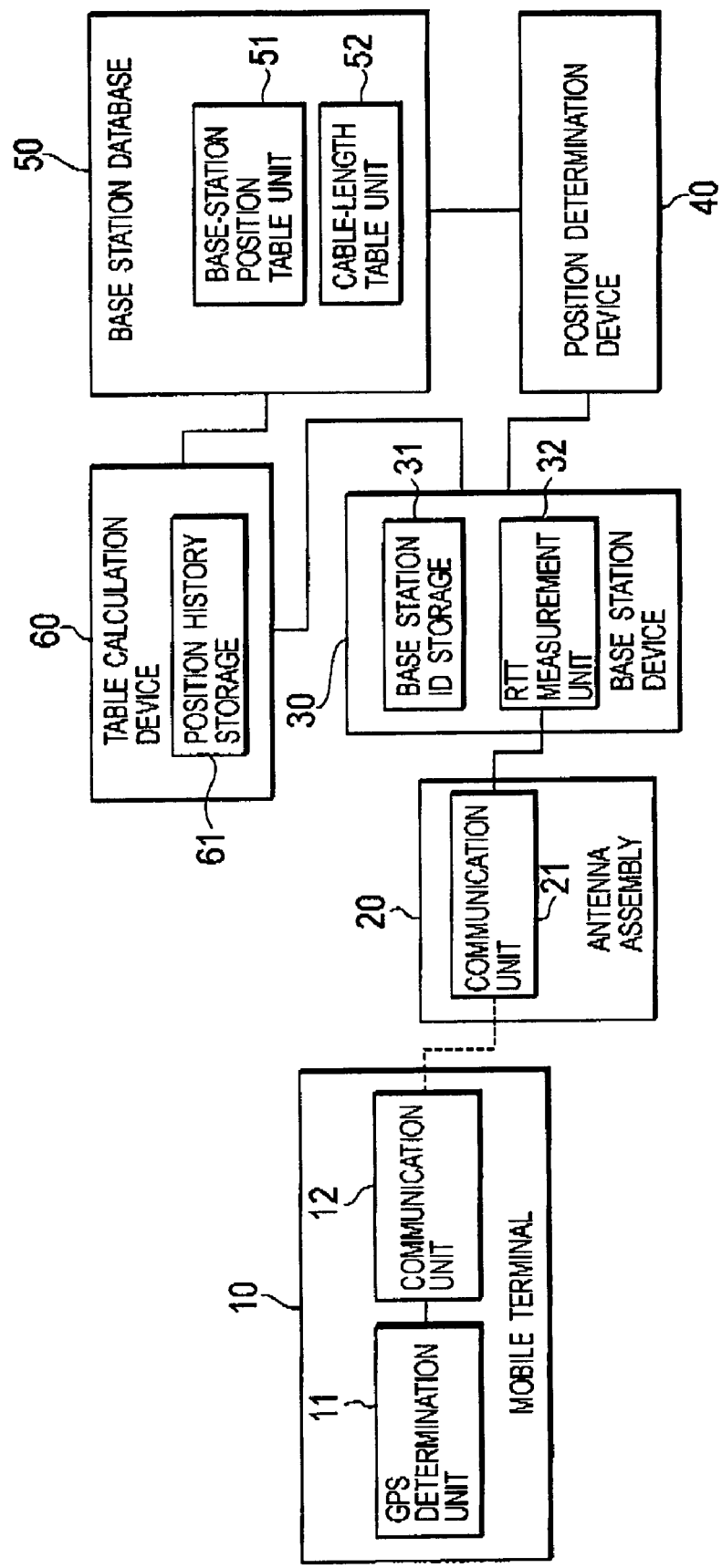
FIG. 4 is a configuration block diagram of a position determination system according to a second embodiment.

As shown in FIG. 4, a position determination system according to the second embodiment is provided with a mobile terminal 10, an antenna assembly 20, a base station device 30, a position determination device 40, a base station database 50 and a table calculation device 60.

The table calculation device 60 is provided with a position history storage 61.

The position history storage 60 receives GPS information from the mobile terminal 10 via the antenna assembly 20 and the base station device 30, and then stores the GPS information. Moreover, the position history storage 60 receives RTT from the base station device 30 and stores the RTT.

The table calculation device 60 updates the base-station position table unit 51 or the cable-length table unit 52 on the basis of the GPS information and the RTT, which are stored in the position history storage 61.

Descriptions of the mobile terminal 10, the antenna assembly 20, the base station device 30, the position determination device 40 and the base station database 50 are omitted here since they are the same as the ones described in the first embodiment (Effect and Advantage)

According to the position determination system and the position determination method in the case of the second embodiment, by updating the base-station position table unit 51 or the cable-length table unit 52 as appropriate, it is possible to prevent the cable length and the base station position information from including an error.

Third Embodiment

In the position determination system described in the first embodiment, there is a possibility that an error is included in GPS information. In a third embodiment, the accuracy of GPS information is determined in accordance with the number of satellites from which the mobile terminal receives GPS information.

Figure 5:
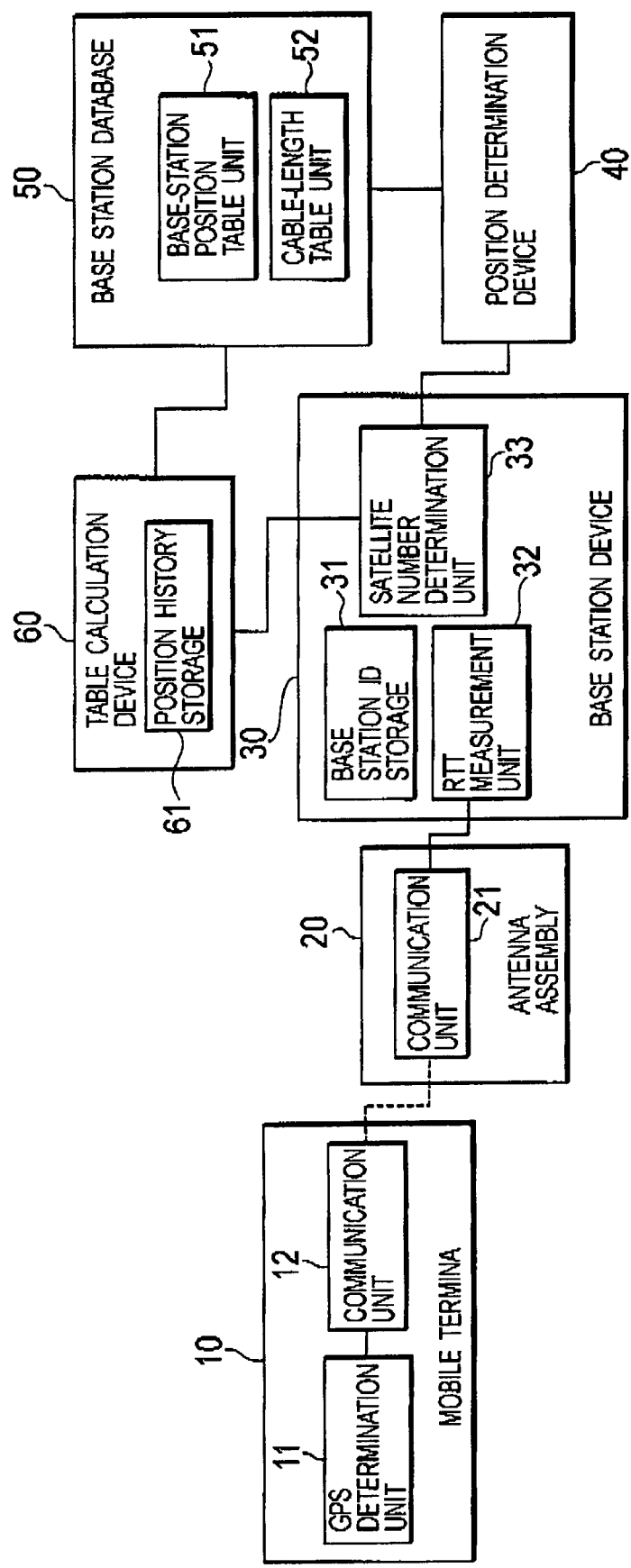
FIG. 5 is a configuration block diagram of a position determination system according to a third embodiment.

As shown in FIG. 5, a position determination system according to the third embodiment is provided with a mobile terminal 10, an antenna assembly 20, a base station device 30, a position determination device 40, a base station database 50 and a table calculation device 60.

The base station device 30 is provided with a base station ID storage 31, an RTT measurement unit 32 and a satellite number determination unit 33.

When the number of satellites from which a GPS determination unit 11 of the mobile terminal 10 has received GPS information is equal to or greater than a predetermined number, the satellite number determination unit 33 trusts the position determined by the GPS determination unit 11 and transmits the GPS information to the position history storage 61 of the table calculation device 60. On the other hand, in a case where the number of satellites falls below the predetermined number, the GPS information is transmitted to the position determination device 40. Here, as the predetermined number of satellites, any value of 3 to 6 is preferably used.

As described above, depending on the situation, the satellite number determination unit 33 determines whether the position is to be redetermined or to be stored as a position history for updating the table.

Descriptions of the other functions of the base station device 30, the mobile terminal 10, the antenna assembly 20, the position determination device 40, the base station database 50 and the table calculation device 60 are omitted here since they are the same as the ones described in the second embodiment.

(Effect and Advantage)

According to the position determination system and the position determination method in the case of the third embodiment, the reliability of GPS information is determined on the basis of the number of satellites from which the mobile terminal 10 has received GPS information. The reliability of GPS information thus determined can be reflected in determining the position.

Fourth Embodiment

In a fourth embodiment, since GPS information may not be received at some places, a description will be given of a case where a maintenance person is allowed to manually input position information to a mobile terminal 10.

Figure 6:
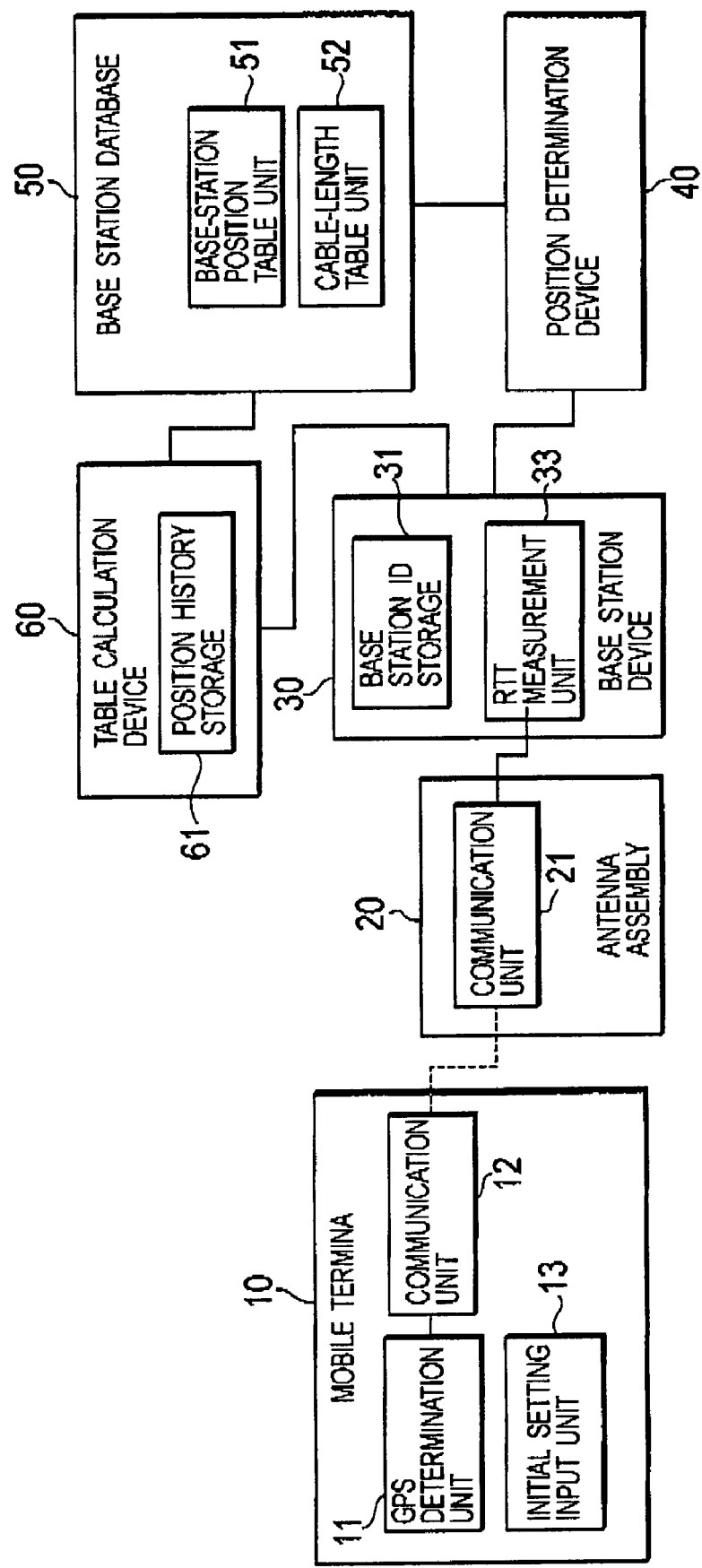
FIG. 6 is a configuration block diagram of a position determination system according to a fourth embodiment.

As shown in FIG. 6, a position determination system according to the fourth embodiment is provided with a mobile terminal 10, an antenna assembly 20, a base station device 30, a position determination device 40, a base station database 50 and a table calculation device 60.

The mobile terminal 10 is provided with a GPS determination unit 11, a communication unit 12 and an initial setting input unit 13.

The initial setting input unit 13 receives position information on the mobile terminal 10. The mobile terminal 10 transmits, instead of GPS information, the inputted position information to the position determination device 40 or the table calculation device 60 via the antenna assembly 20.

Descriptions of the other functions of the mobile terminal 10, the antenna assembly 20, the base station device 30, the position determination device 40, the base station database 50 and the table calculation device 60 are omitted here since they are the same as the ones described in the second embodiment.

(Effect and Advantage)

According to the position determination system and the position determination method in the case of the fourth embodiment, even in a case where the mobile terminal 10 cannot receive GPS information, a position can be determined or the database can be updated.

Fifth Embodiment

In a fifth embodiment, in order to increase accuracy with respect to the position of an antenna, a description will be given of a case where an antenna position table is provided.

Figure 7:
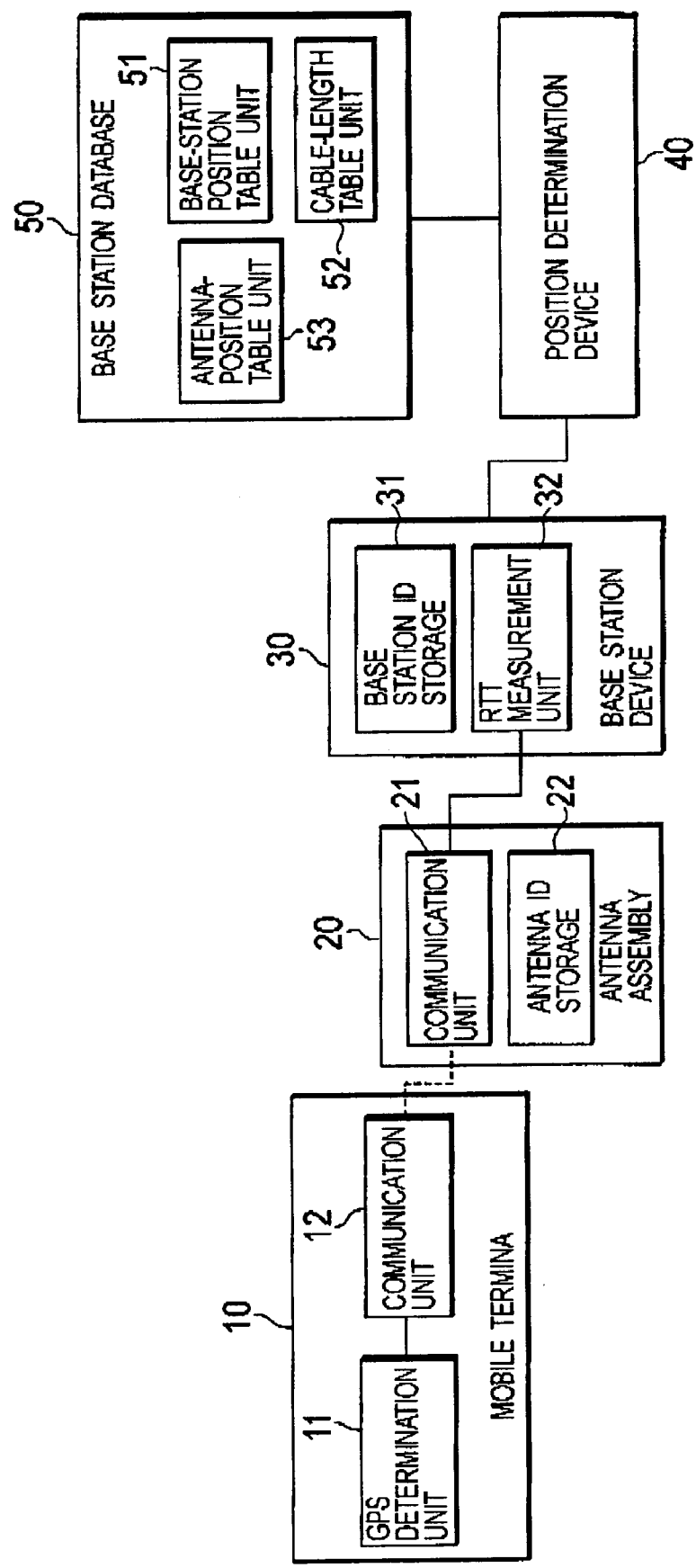
FIG. 7 is a configuration block diagram of a position determination system according to a fifth embodiment.

As shown in FIG. 7, a position determination system according to the fifth embodiment is provided with a mobile terminal 10, an antenna assembly 20, a base station device 30, a position determination device 40 and a base station database 50.

The antenna assembly 20 is provided with a communication unit 21 and an antenna ID storage 22.

The antenna ID storage 22 is configured to store an antenna ID, which is an identification number unique to the antenna assembly 20.

The base station database 50 is provided with a base-station position table unit 51, a cable-length table unit 52 and an antenna-position table unit 53.

The antenna-position table unit 53 is configured to store the position information on the antenna assembly 20 for each antenna ID.

The position determination device 40 takes the position information on the antenna assembly 20 into consideration when determining the distance between the antenna assembly 20 and the mobile terminal 10, the position information being stored in the antenna-position table unit 53.

Descriptions of the mobile terminal 10, the other functions of the antenna 20, the base station device 30, the position determination device 40 and the other functions of the base station database 50 are omitted here since they are the same as the ones described in the first embodiment.

(Effect and Advantage)

According to the position determination system and the position determination method in the case of the fifth embodiment, accuracy with respect to the position information on the antenna assembly 20 can be improved. Thus, the position information on the mobile terminal 10 can be determined with further accuracy.

Sixth Embodiment

In a sixth embodiment, a description will be given of a case where the antenna-position table unit 53 described in the fifth embodiment is updated.

Figure 8:
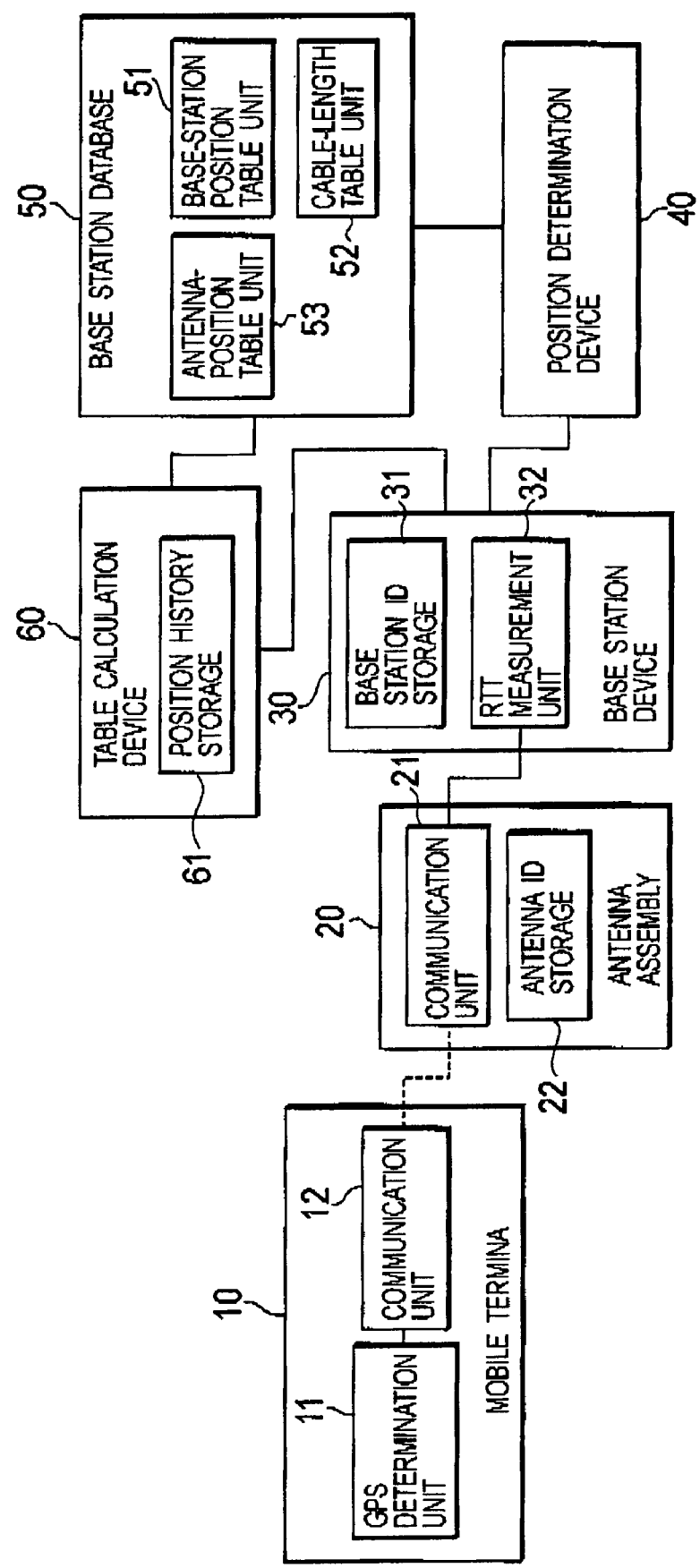
FIG. 8 is a configuration block diagram of a position determination system according to a sixth embodiment.

As shown in FIG. 8, a position determination system according to the sixth embodiment is provided with a mobile terminal 10, an antenna assembly 20, a base station device 30, a position determination device 40, a base station database 50 and a table calculation device 60.

The table calculation device 60 is configured to update the position information on an antenna assembly, which is stored in the antenna table unit 53.

Descriptions of the mobile terminal 10, the antenna assembly 20, the base station device 30, the position determination device 40, the base station database 50 and the other functions of the table calculation device 60 are omitted here since they are the same as the ones described in the second embodiment.

(Effect and Advantage)

According to the position determination system and the position determination method in the case of the sixth embodiment, the position information on an antenna assembly 20 can be updated as appropriate.

Seventh Embodiment

In a seventh embodiment, a description will be given of a position determination system provided with the satellite number determination unit 33 described in the third embodiment, the antenna ID storage 22 and the antenna-position table unit 53, described in the fifth embodiment, and the table calculation device 60 described in the sixth embodiment.

Figure 9:
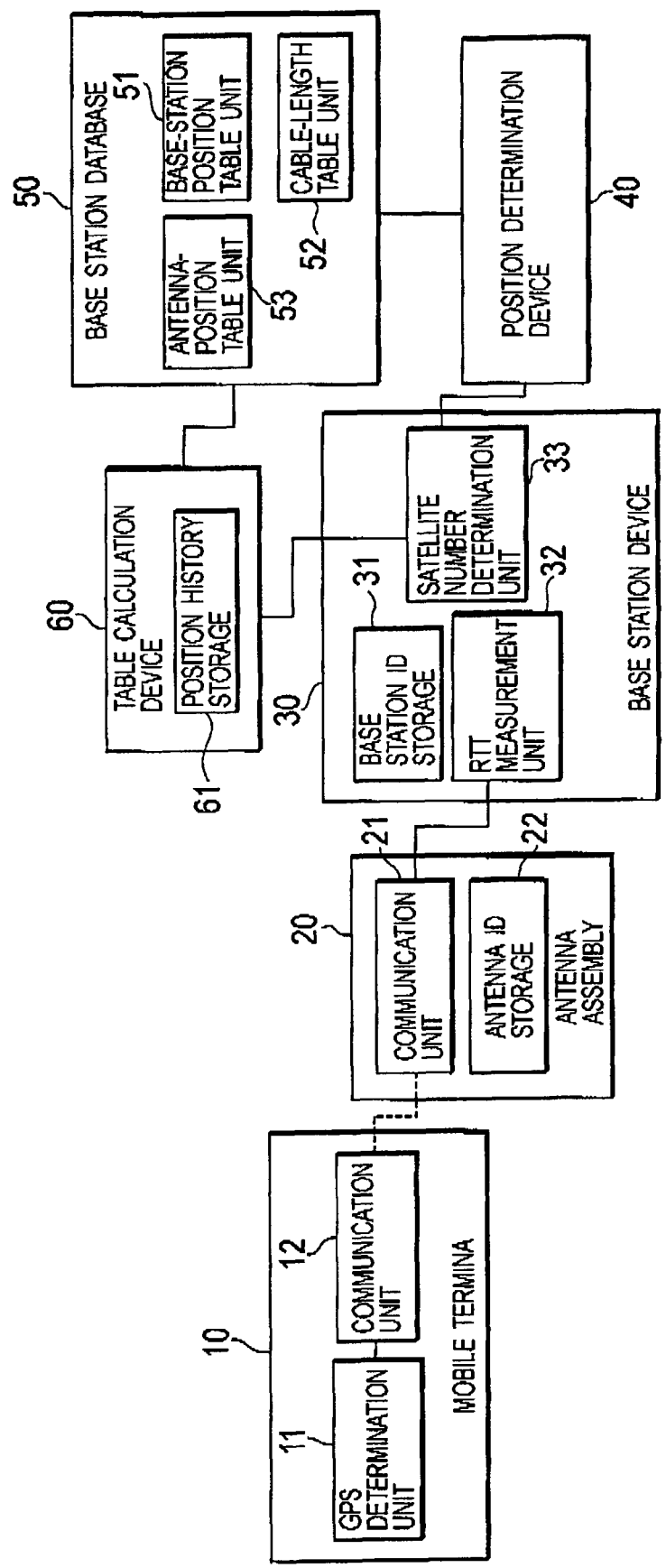
FIG. 9 is a configuration block diagram of a position determination system according to a seventh embodiment.

As shown in FIG. 9, the position determination system according to the seventh embodiment is provided with a mobile terminal 10, an antenna assembly 20, a base station device 30, a position determination device 40, a base station database 50 and a table calculation device 60.

In a case where the number of satellites from which the GPS determination unit 11 of the mobile terminal 10 has received GPS information is equal to or greater than a predetermined number, the satellite number determination unit 33 trusts the position determined by the GPS determination unit 11, and then transmits the position information to the position history storage 61 of the table calculation device 60. On the other hand, in a case where the number of satellites falls below the predetermined number, the GPS information is transmitted to the position determination device 40. Here, as the predetermined number, any value of 3 to 6 is preferably used.

The antenna ID storage 22 is configured to store an antenna ID, which is an identification number unique to the antenna assembly 20.

The antenna-position table unit 53 is configured to store the position information on the antenna assembly 20 for each antenna ID.

The table calculation device 60 is configured to update the position information on the antenna assembly 20, which is stored in the antenna position table 53.

Descriptions of the mobile terminal 10, the other functions of the antenna assembly 20, the base station device 30, the position determination device 40, the other functions of the base station database 50 and of the table calculation device 60 are omitted here since they are the same as the ones described in the second embodiment.

(Effect and Advantage)

According to the position determination system and the position determination method in the case of the seventh embodiment, the reliability of GPS information is determined on the basis of the number of satellites from which the mobile terminal 10 has received GPS information. The reliability can be thus reflected in determining the position of the mobile terminal 10. Moreover, accuracy with respect to the position information on the antenna assembly 20 can be improved. Thereby, the position of the mobile terminal 10 can be determined with further accuracy. Furthermore, the position information on the antenna assembly 20 can be updated as appropriate.

Eighth Embodiment

In an eighth embodiment, a description will be given of a position determination system provided with the initial setting input unit 13 described in the fourth embodiment, the antenna ID storage 22 and the antenna-position table unit 53, described in the fifth embodiment, and the table calculation device 60 described in the sixth embodiment.

Figure 10:
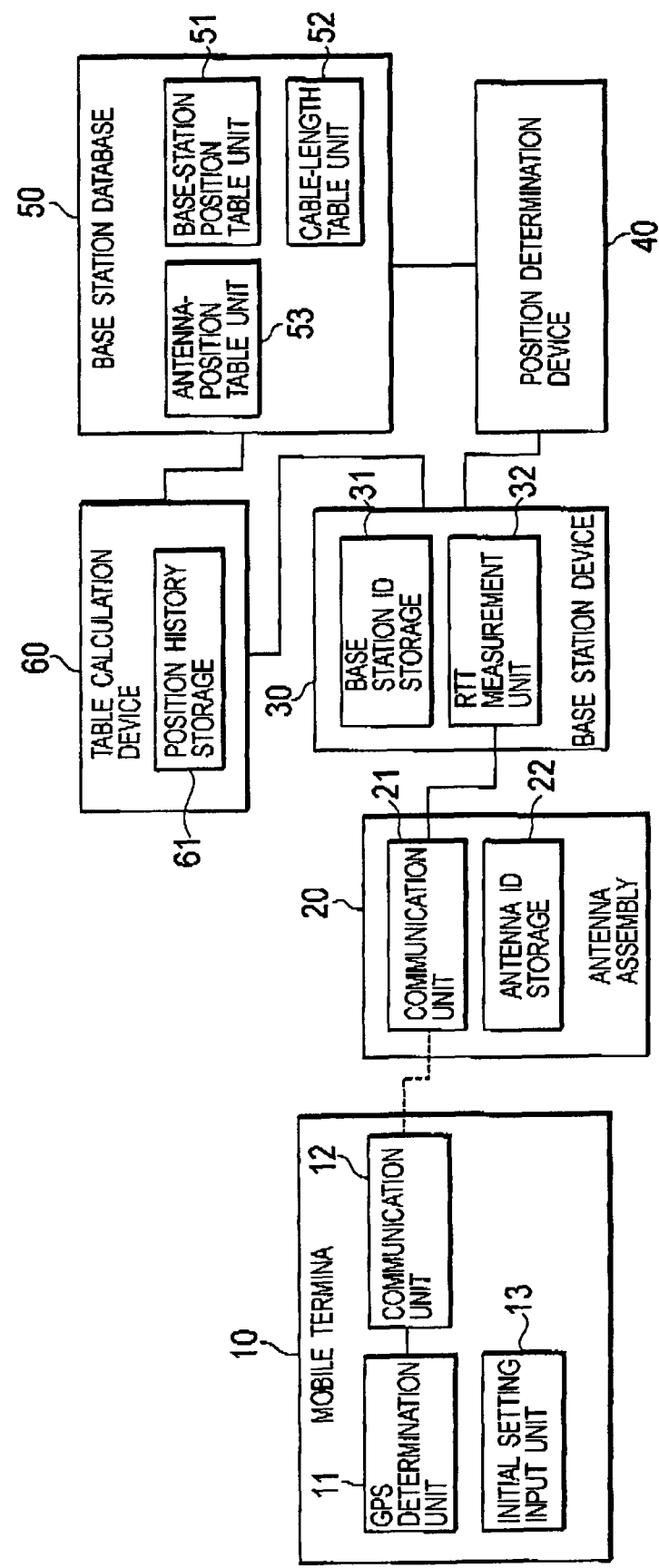
FIG. 10 is a configuration block diagram of a position determination system according to an eighth embodiment.

As shown in FIG. 10, the position determination system according to the eighth embodiment is provided with a mobile terminal 10, an antenna assembly 20, a base station device 30, a position determination device 40, a base station database 50 and the table calculation device 60.

The initial setting input unit 13 receives position information on the mobile terminal 10. The mobile terminal 10 transmits, instead of GPS information, the inputted position information to the position determination device 40 or the table calculation device 60 via the antenna assembly 20.

The antenna ID storage 22 is configured to store an antenna ID, which is an identification number unique to the antenna assembly 20.

The antenna-position table unit 53 is configured to store the position information on the antenna assembly 20 for each antenna ID.

The table calculation device 60 is configured to update the position information on an antenna assembly, which is stored in the antenna-position table unit 53.

Descriptions of the other functions of the mobile terminal 10, the antenna assembly 20, the base station device 30, the position determination device 40, and the other functions of the base station database 50 and of the table calculation device 60 are omitted here since they are the same as the ones described in the second embodiment.

(Effect and Advantage)

According to the position determination system and the position determination method in the case of the eighth embodiment, even in a case where a mobile terminal 10 cannot receive GPS information, a position can be determined or the database can be updated. Moreover, accuracy with respect to the position information on the antenna assembly 20 can be improved. Thereby, the position of the mobile terminal 10 can be determined with further accuracy. Furthermore, the position information on the antenna assembly 20 can be updated as appropriate.

Ninth Embodiment

In a ninth embodiment, a description will be given of a case where a terminal device that is LMU (location measurement unit) compliant is used as a mobile terminal 10.

Figure 11:
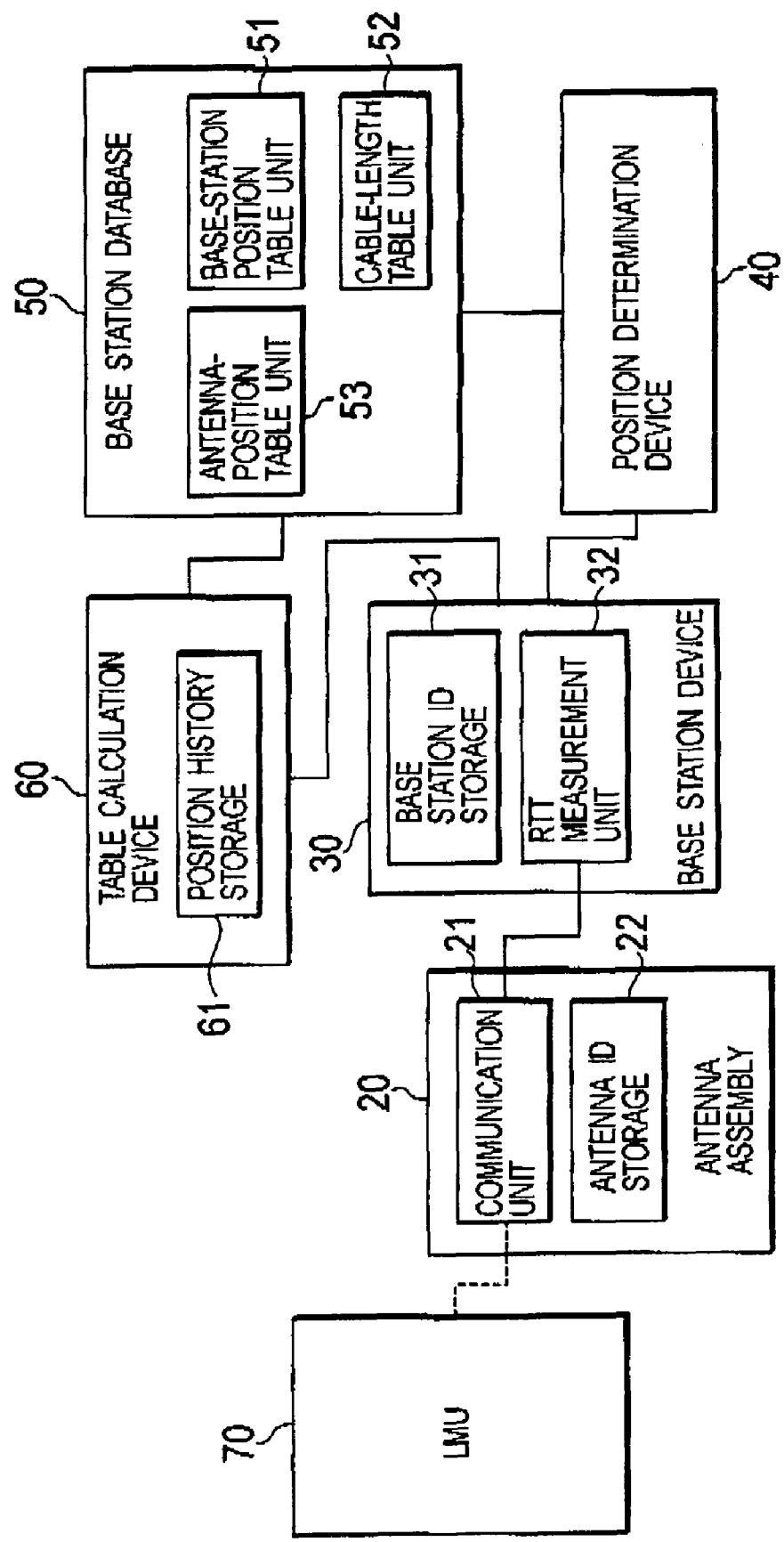
FIG. 11 is a configuration block diagram of a position determination system according to a ninth embodiment.

As shown in FIG. 11, a position determination system according to the ninth embodiment is provided with an LMU 70, an antenna assembly 20, a base station device 30, a position determination device 40, a base station database 50 and a table calculation device 60.

The LMU 70 is a mobile terminal that is LMU compliant. An LMU compliant mobile terminal is equipped with functions equivalent to a GPS receiver and a communication unit. Thus, the present invention can be easily applied.

It should be noted that descriptions of the LMU is provided in "3GPP TS 23.007" and the like.

Descriptions of the antenna assembly 20, the base station device 30, the position determination device 40, the base station database 50 and the table calculation device 60 are omitted here since they are the same as the ones described in the second embodiment.

(Effect and Advantage)

According to the position determination system and the position determination method in the case of the ninth embodiment, the present invention can be easily applied since an LMU compliant mobile terminal is used.

Other Embodiments

Although the present invention has been described in the cases of the aforementioned embodiments, the descriptions and drawings partially constituting this disclosure should not be understood as limiting the present invention. From the descriptions in this disclosure, various alternative embodiments, examples and operation techniques will be apparent to those skilled in the art.

For example, although in the aforementioned embodiments, the position determination device 40, the base station database 50 and the table calculation device 60 are described as different devices, these devices may be provided in a single device. Moreover, the functions of the position determination device 40, of the base station database 50 and of the table calculation device 60 may all be provided in the base station device 30.

As described above, the present invention includes various embodiments not described herein as a matter of course. Accordingly, the technical scope of the invention should be determined only on the basis of specified features of the aforementioned inventive descriptions and appropriate appended claims.

What is claimed is:

1. A position determination system comprising:
   a mobile terminal configured to receive GPS information from a GPS;
   a base station device configured to measure a round trip time from the mobile terminal;
   a base-station position table unit configured to store position information on the base station;
   a cable-length table unit configured to store a cable length between the base station device and an antenna assembly provided to the base station device, the antenna assembly communicates with the mobile terminal;
   a position determination device configured to determine the position of the mobile terminal on the basis of the round trip time measured by the base station device, the cable length obtained from the cable-length table unit, the position information on the base station obtained from the base station position table unit and the GPS information received from the mobile terminal; and
   a table calculation device including a position history storage configured to store the GPS information received from the mobile terminal and the round trip time received from the base station device, wherein the table calculation device is configured to update the base-station position table unit and the cable-length table unit on the basis of the GPS information and the round trip time stored at the position history storage.

2. The position determination system according to claim 1, further comprising:
   a satellite number determination unit configured to transmit the GPS information to the table calculation device in a case where the number of satellites from which the mobile terminal has received the GPS information is equal to or greater than a predetermined number, and to transmit the GPS information to the position determination device in a case where the number of satellites from which the mobile terminal has received the GPS information, falls below the predetermined number.

3. The position determination system according to claim 1, wherein the mobile terminal includes an initial setting input unit configured to receive an input of position information on the mobile terminal.

4. The position determination system according to claim 1, further comprising:
   an antenna-position table unit configured to store position information on the antenna assembly,
   wherein the position determination device further determines the position of the mobile terminal on the basis of the position information on the antenna assembly, which is stored in the antenna table unit.

5. The position determination system according to claim 4, wherein the table calculation device updates the position information on the antenna assembly, which is stored in the antenna-position table unit.

6. The position determination system according to claim 1, wherein the mobile terminal is LMU compliant.

7. A position determination method comprising:
   receiving GPS information from a GPS by a mobile terminal;
   measuring a round trip time from the mobile terminal by a base station device;

determining the position of the mobile terminal on the basis of the round trip time measured by the base station device, a cable length obtained from a cable-length table unit configured to store a cable length between the base station device and an antenna assembly communicating with the mobile terminal, position information on the base station device obtained from a base-station position table unit configured to store the position information on the base station device, and GPS information received from the mobile terminal;

storing the GPS information received from the mobile terminal and the round trip time received from the base station device; and updating the base-station position table unit and the cable-length table unit on the basis of the stored GPS information and the stored round trip time received from the base station device.

8. The position determination method according to claim 7, further comprising:

updating the base-station position table unit and the cable-length table unit on a basis of the GPS information received from the mobile terminal and of the round trip time received from the base station device in a case where the number of satellites from which the mobile terminal has received the GPS information is equal to or greater than a predetermined number.

9. The position determination system according to claim 1, further comprising:

a table calculation device configured to update the base-station position table unit and the cable-length table unit on a basis of the GPS information received from the mobile terminal and of the round trip time received from the base station device, in a case where the number of satellites from which the mobile terminal has received the GPS information is equal to or greater than a predetermined number.

* * * * *